(12) United States Patent
Kasmirsky et al.

(10) Patent No.: US 8,195,616 B2
(45) Date of Patent: Jun. 5, 2012

(54) CONTENT-BASED STORAGE MANAGEMENT

(75) Inventors: Yehoshaphat Kasmirsky, Rehovot (IL);
Ilan Kor, Tel Mond (IL); Avishai Elazar, Ra'anana (IL)

(73) Assignee: Nice Systems Ltd., Raanana (IL)

( * ) Notice: Subject to any disclaimer, the term of this patent is extended or adjusted under 35 U.S.C. 154(b) by 0 days.

(21) Appl. No.: 12/697,645

(22) Filed: Feb. 1, 2010

(65) Prior Publication Data
US 2010/0138459 A1 Jun. 3, 2010

Related U.S. Application Data

(63) Continuation of application No. 10/766,851, filed on Jan. 30, 2004, now Pat. No. 7,664,794, which is a continuation-in-part of application No. 10/451,371, filed as application No. PCT/IL02/00009 on Jan. 3, 2002, now abandoned, said application No. 10/766,851 is a continuation-in-part of application No. 10/367,749, filed on Feb. 19, 2003, now Pat. No. 6,959,079, which is a continuation of application No. 09/503,479, filed on Feb. 14, 2000, now Pat. No. 6,542,602.

(60) Provisional application No. 60/259,158, filed on Jan. 3, 2001.

(51) Int. Cl.
*G06F 17/30* (2006.01)
(52) U.S. Cl. ..................................................... 707/665
(58) Field of Classification Search .................. 707/665, 707/667, 668, 812, 999.204
See application file for complete search history.

(56) References Cited

U.S. PATENT DOCUMENTS

| | | |
|---|---|---|
| 3,811,008 A | 5/1974 | Lee |
| 4,673,974 A | 6/1987 | Ito et al. |
| 4,814,869 A | 3/1989 | Oliver et al. |
| 4,862,292 A | 8/1989 | Enari et al. |
| 4,881,178 A | 11/1989 | Holland et al. |
| 4,920,424 A | 4/1990 | Hosaka et al. |
| 4,943,854 A | 7/1990 | Shiota et al. |
| 5,131,087 A | 7/1992 | Warr |
| 5,164,900 A | 11/1992 | Bernath |

(Continued)

FOREIGN PATENT DOCUMENTS

DE 4106246 3/1992

(Continued)

OTHER PUBLICATIONS

Daniel s. Tkach, Information Mining with the IBM Intelligent Miner Family, Feb. 1998, IBM.*

(Continued)

*Primary Examiner* — Thu-Nguyet Le
(74) *Attorney, Agent, or Firm* — Pearl Cohen Zedek Latzer, LLP

(57) ABSTRACT

Embodiments of the invention are directed to a system and method for data management according to the content of the data. The system may enable data to be stored in one of a plurality of different storage options according to at least one characteristic of the data, in which the at least one characteristic is related to the content of the data. The system may comprise a rule-based storage management mechanism for the processes of archiving and/or retrieving data. Optionally, the data is stored for a time interval according to the at least one characteristic of the data and may be moved to a different type of storage option after an event occurs, for example the time interval has elapsed.

16 Claims, 6 Drawing Sheets

U.S. PATENT DOCUMENTS

| | | | |
|---|---|---|---|
| 5,193,000 | A | 3/1993 | Lipton et al. |
| 5,295,198 | A | 3/1994 | Maney |
| 5,333,091 | A | 7/1994 | Iggulden et al. |
| 5,343,240 | A | 8/1994 | Yu |
| 5,351,129 | A | 9/1994 | Lai |
| 5,398,138 | A | 3/1995 | Tomita |
| 5,438,674 | A * | 8/1995 | Keele et al. ............ 711/4 |
| 5,469,560 | A | 11/1995 | Beglin |
| 5,506,986 | A | 4/1996 | Healy |
| 5,526,133 | A | 6/1996 | Paff |
| 5,579,239 | A | 11/1996 | Freeman et al. |
| 5,581,297 | A | 12/1996 | Koz et al. |
| 5,600,366 | A | 2/1997 | Schulman |
| 5,632,007 | A | 5/1997 | Freeman |
| 5,761,601 | A | 6/1998 | Nemirofsky et al. |
| 5,794,244 | A | 8/1998 | Brosch et al. |
| 5,812,994 | A | 9/1998 | Imlah |
| 5,832,083 | A | 11/1998 | Iwayama et al. |
| 5,926,605 | A | 7/1999 | Ichimura |
| 5,970,171 | A | 10/1999 | Baraghimian et al. |
| 5,991,751 | A | 11/1999 | Rivette et al. |
| 5,991,753 | A | 11/1999 | Wilde |
| 6,002,427 | A | 12/1999 | Kipust |
| 6,049,804 | A | 4/2000 | Burgess et al. |
| 6,074,431 | A | 6/2000 | Watanabe et al. |
| 6,091,771 | A | 7/2000 | Seeley et al. |
| 6,188,831 | B1 | 2/2001 | Ichimura |
| 6,229,951 | B1 | 5/2001 | Schultz et al. |
| 6,389,432 | B1 | 5/2002 | Pothapragada et al. |
| 6,446,160 | B1 | 9/2002 | Le et al. |
| 6,542,972 | B2 * | 4/2003 | Ignatius et al. ............ 711/154 |
| 6,564,263 | B1 | 5/2003 | Bergman et al. |
| 6,651,045 | B1 * | 11/2003 | Macaulay ............ 706/11 |
| 6,678,752 | B1 | 1/2004 | Ashton et al. |
| 6,738,800 | B1 | 5/2004 | Aquilon et al. |
| 6,741,963 | B1 * | 5/2004 | Badt et al. ............ 704/270 |
| 6,833,865 | B1 | 12/2004 | Fuller et al. |
| 6,850,252 | B1 | 2/2005 | Hoffberg |
| 6,877,134 | B1 | 4/2005 | Fuller et al. |
| 6,922,759 | B1 | 7/2005 | Garritsen |
| 6,959,079 | B2 | 10/2005 | Elazar |
| 6,978,297 | B1 | 12/2005 | Piersol |
| 7,020,888 | B2 | 3/2006 | Reynolds et al. |
| 7,127,473 | B2 | 10/2006 | Agassi et al. |
| 7,143,096 | B2 | 11/2006 | Gemba et al. |
| 7,213,005 | B2 | 5/2007 | Mourad et |
| 2001/0040942 | A1 * | 11/2001 | Glowny et al. ............ 379/88.22 |
| 2001/0049826 | A1 | 12/2001 | Wilf |
| 2001/0052019 | A1 * | 12/2001 | Walters et al. ............ 709/231 |
| 2002/0039408 | A1 | 4/2002 | Hall et al. |
| 2002/0180803 | A1 | 12/2002 | Kaplan et al. |
| 2003/0117505 | A1 | 6/2003 | Sasaki et al. |
| 2005/0008198 | A1 | 1/2005 | Guo et al. |
| 2007/0033515 | A1 | 2/2007 | Sull et al. |

FOREIGN PATENT DOCUMENTS

| | | |
|---|---|---|
| DE | 4442264 | 5/1996 |
| DE | 19525226 | 1/1997 |
| DE | 19848194 | 5/2000 |
| EP | 0285449 | 10/1988 |
| EP | 0341230 | 11/1989 |
| EP | 0488297 | 6/1992 |
| EP | 0539106 | 4/1993 |
| EP | 0629962 | 12/1994 |
| EP | 0762300 | 3/1997 |
| EP | 0785675 | 7/1997 |
| EP | 0807922 | 11/1997 |
| EP | 950965 | 10/1999 |
| EP | 0996289 | 4/2000 |
| EP | 1006685 | 6/2000 |
| EP | 1030508 | 8/2000 |
| EP | 0782730 | 6/2003 |
| EP | 1039753 | 5/2006 |
| GB | 2369263 | 5/2002 |
| JP | 62233859 | 10/1987 |
| JP | 62249270 | 10/1987 |
| JP | 03062128 | 3/1991 |
| JP | 03063735 | 3/1991 |
| JP | 03108029 | 5/1991 |
| JP | 03265029 | 11/1991 |
| JP | 03282657 | 12/1991 |
| JP | 03282843 | 12/1991 |
| JP | 04178829 | 6/1992 |
| JP | 04242844 | 8/1992 |
| JP | 05061744 | 3/1993 |
| JP | 05158765 | 6/1993 |
| JP | 05216736 | 8/1993 |
| JP | 05233706 | 9/1993 |
| JP | 05241922 | 9/1993 |
| JP | 05298081 | 11/1993 |
| JP | 06175704 | 6/1994 |
| JP | 06202920 | 7/1994 |
| JP | 06222964 | 8/1994 |
| JP | 06309199 | 11/1994 |
| JP | 06324930 | 11/1994 |
| JP | 06332927 | 12/1994 |
| JP | 07121382 | 5/1995 |
| JP | 07129447 | 5/1995 |
| JP | 08194636 | 7/1996 |
| JP | 09081590 | 3/1997 |
| JP | 09245057 | 9/1997 |
| JP | 10021161 | 1/1998 |
| JP | 10105605 | 4/1998 |
| JP | 10126354 | 5/1998 |
| JP | 10214265 | 8/1998 |
| JP | 10320409 | 12/1998 |
| JP | 10334114 | 12/1998 |
| JP | 11066076 | 3/1999 |
| JP | 11073431 | 3/1999 |
| JP | 11143897 | 5/1999 |
| JP | 11252163 | 9/1999 |
| JP | 11316763 | 11/1999 |
| JP | 11327995 | 11/1999 |
| JP | 11328218 | 11/1999 |
| JP | 11338753 | 12/1999 |
| JP | 2000099508 | 4/2000 |
| JP | 2000112993 | 4/2000 |
| JP | 2000148793 | 5/2000 |
| JP | 2000165806 | 6/2000 |
| JP | 2000215123 | 8/2000 |
| WO | WO 94/27404 | 11/1994 |
| WO | WO 96/27983 | 9/1996 |
| WO | WO 97/49251 | 12/1997 |
| WO | WO 98/19450 | 5/1998 |
| WO | WO 99/03275 | 1/1999 |
| WO | WO 99/26409 | 5/1999 |
| WO | WO 99/27556 | 6/1999 |
| WO | WO 99/66719 | 12/1999 |
| WO | WO 00/07367 | 2/2000 |
| WO | WO 00/10327 | 2/2000 |
| WO | WO 00/13078 | 3/2000 |
| WO | WO 00/29960 | 5/2000 |
| WO | WO 00/43935 | 7/2000 |
| WO | WO 00/48400 | 8/2000 |
| WO | WO 00/68841 | 11/2000 |
| WO | WO 00/77690 | 12/2000 |
| WO | WO 02/054221 | 7/2002 |

OTHER PUBLICATIONS

Ishikawa et al. "A document Warehouse: A Multimedia Database Approach", DEXA Workshop 1998: 90-94, 1998.
US Office Action U.S. Appl. No. 10/451,371 dated Feb. 20, 2008.
US Office Action U.S. Appl. No. 10/451,371 dated Jun. 30, 2006.
US Office Action U.S. Appl. No. 10/451,371 dated Dec. 11, 2006.
US Office Action U.S. Appl. No. 10/451,371 dated Sep. 4, 2007.
Rodney Bliss et al. "Exchange Connectivity Guide", pp. 1-350, Published Jan. 1, 1997 Microsoft Professional Editions, Microsoft Press.
Oppliger Rolf "Security Technologies for the World Wide Web", pp. 47-51, Published Jan. 2000 Computer Security Series.

* cited by examiner

CONTENT-BASED STORAGE MANAGEMENT

This is a continuation application of of patent application Ser. No. 10/766,851 filed Jan. 30, 2004, now U.S. Pat. No. 7,664,794, which is a continuation-in-part application of patent application Ser. No. 10/451,371 filed Jul. 2, 2003, now abandoned, which is a National Phase application of PCT/IL02/00009, filed Jan. 3, 2002, entitled "CONTENT-BASED STORAGE MANAGEMENT" which in turn claims priority from provisional patent application No. 60/259,158, filed Jan. 3, 2001. This is also a continuation-in-part application of patent application Ser. No. 10/367,749, filed Feb. 19, 2003, now U.S. Pat. No. 6,959,079 which is a continuation application of patent application Ser. No. 09/503,479, filed Feb. 14, 2000, now U.S. Pat. No. 6,542,602, all of which are incorporated by reference herein in their entirety.

FIELD OF THE INVENTION

The present invention relates to a system and a method for content-based storage management, and in particular, for such a system and method in which decisions concerning the location and/or retention and/or compression of storage of data are based upon the content of the data or any business rule the user defines.

BACKGROUND OF THE INVENTION

Storage facilities for digital information are a critical resource. The demand for storage space for both conventional data, such as text documents and other human readable files, and multimedia streams, such as audio and/or video data, has increased significantly. Such an increase results from a number of different factors, such as legal requirements to store and maintain certain types of information; an increase in the different types of data which are being stored; and even an increase in the size of individual units of data, such as word processing document files, video data files and so forth. This increased demand has in turn resulted in a higher demand for storage space, and in particular for storage space which is accessible "on-line".

As the demand for on-line storage space increases, a number of options are possible to fulfill that demand. For example, additional hardware, such as magnetic media devices ("hard disk drives"), may be purchased to increase the available amount of electronically accessible storage space. However, as the quantity of such hardware devices increases, the management problem for electronic management of these devices also increases. Furthermore, merely increasing the storage space may be both wasteful and unnecessary, since not all of the data may be required, or at least not required for immediate access.

The problem may be partially alleviated through the use of a mixture of different types of storage facilities. For example, on-line storage refers to direct-access, permanently mounted storage areas, such as magnetic (or other types of media) disk drives and disk arrays. The time required for access to such storage areas to be made is typically measured in fractions of a second. On line storage is fast, but is also expensive, and therefore may not be available for the entire amount of storage needed by an organization. Since not all data may need to be stored in on-line storage, near-line storage is available however for customer use. Near-line storage is based upon an automatically (machine) operated storage area, such as optical disks residing on a disk "jukebox" or tapes in an automatic tape library. Such automatically operated storage devices are able to store and automatically access a relatively large amount of data with fewer physical reading devices, or drives, for reading the data. This type of storage is less expensive, but also somewhat slower for accessing the data, such that access times are measured in seconds to minutes, or even longer, depending upon the availability of physical drives for reading the storage media. On-line or near-line storage may also feature a system with a plurality of physical drives, connected together, for example in a LAN (local area network) or WAN (wide area network).

Off-line storage is the least expensive type of storage, but is also the slowest for access, as it does not permit automatic electronic access. Instead, manual operation of the storage devices and physical drives is required by a human operator. The number of physical drives is greatly reduced compared to the number of storage devices (or at least the amount of available storage space). However, the access time for data from such devices is measured from minutes to hours, depending upon the availability of the human operator and the location of the storage devices, as well as the availability of the physical drives.

Other types of storage devices and functions may also be used, in addition to, or in replacement for, the above-described devices and functions. In any case, the difficulty with a mixed system, or a system in which different types of storage areas (topology) are used, with different types of storage devices and different accessibility (particularly with regard to access time) and/or capacity, is the management of the data. Certain types of data may be more important, or at least more time-critical for access, such that the access time may be very important for some types of data, and much less important for other types of data. In addition, the importance of data, and therefore the retention policy regarding this data may change over time, and have to be appropriately handled in the system. Cost is also an important factor. Also, decisions must be made concerning the number and type of storage devices to be purchased, along with any required supporting devices and/or system support, such as human operators for example. Currently, these systems are designed and constructed manually, and decisions are made on the basis of some type of policy. However, the operation of the actual system and even the design itself may not be optimal for a particular organization.

SUMMARY OF THE INVENTION

The background art does not teach or suggest a solution to the problem of efficiently managing data storage, specifically with regard to storage management based on the content of the data. The background art also does not teach or suggest a solution to the problem of managing data storage for both cost efficiency and for suitable access times, according to the content of the data. The background art also does not provide a solution for storing data according to the content of the data, such that important data can be stored in a more accessible location/type of file storage. In addition, the background art does not teach or suggest a system and method for managing data, such that data is correctly stored, migrated and/or deleted, according to the content thereof.

The present invention overcomes these problems of the background art by providing a system and a method for data management according to the content of the data. The present invention enables data to be stored in one of a plurality of different storage options, having different capacity, accessibility and reliability to the user. The data is stored according to at least one characteristic of the data, in which the at least one characteristic is related to the content of the data. Possible characteristics defining the time interval and the storage option to be chosen include, but are not limited to creation time, certain parts of data content, such as a specific digital signature in the data, certain words said in telephone conversations being stored, or CRM (Customer Relationship Management) oriented information, for example a specific sale to which the data is related. It should be noted that at least one storage option according to the present invention is optionally deletion and/or destruction of the data, such that the data may optionally be removed from storage media or may optionally not be stored initially on the storage media. Therefore, a "storage option" according to the present invention includes any type of storage media, device, system or combination thereof, or deletion (removal) of the data.

Optionally and more preferably, the data is stored for a time interval according to the at least one characteristic of the data. Most preferably, the data is moved to a different type of storage option after an event has occurred, for example after the time interval has elapsed, or the importance of the data has changed. It should be noted that movement or migration of the data may also include deletion or removal of the data.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
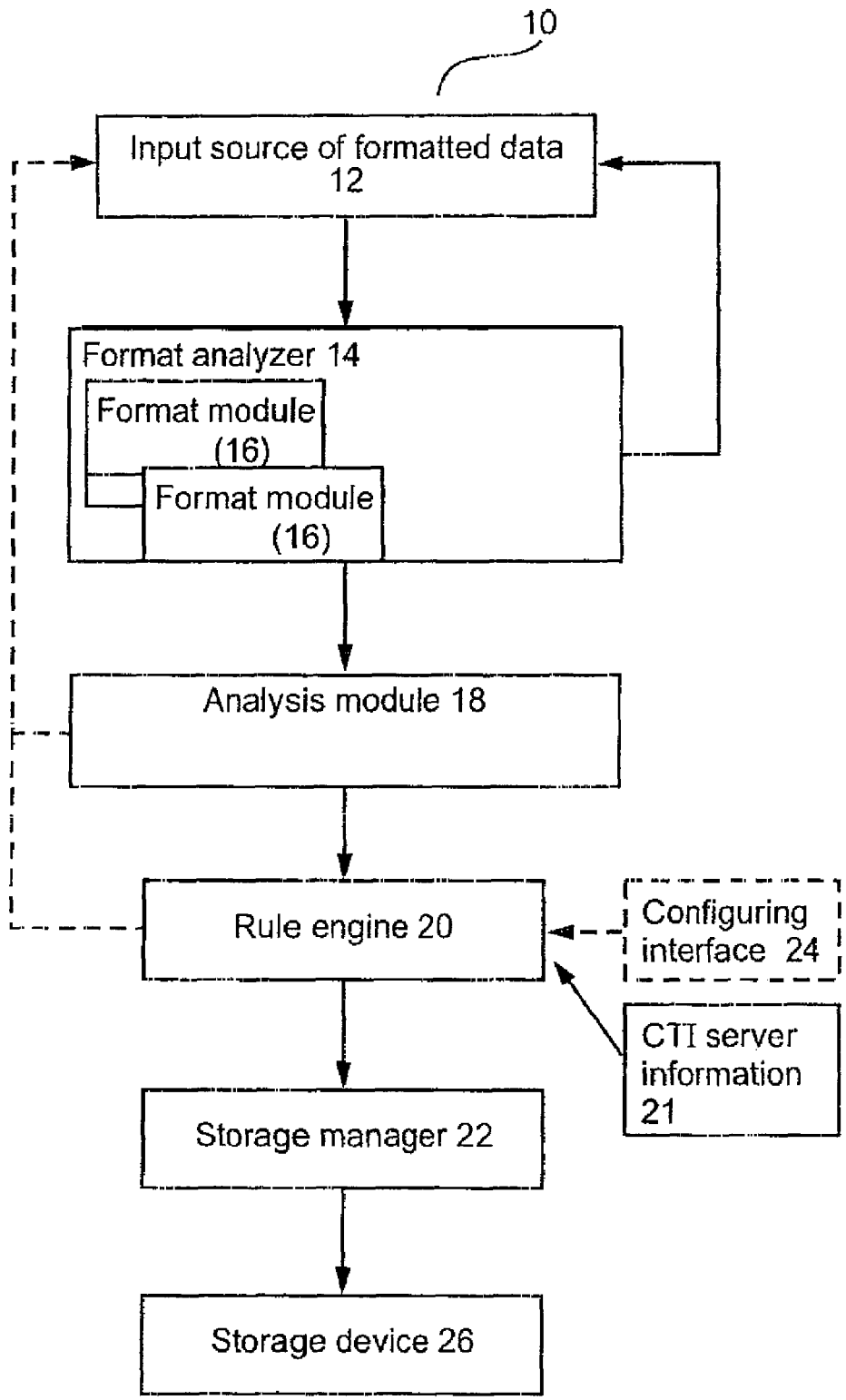
FIG. 1 is a schematic block diagram of an exemplary system and flow of operations according to the present invention.

The present invention is of a system and method for data management according to the content of the data and/or external metadata parameters that belong to the data. The present invention enables data to be stored in one of a plurality of different storage options, having different capacity, accessibility and reliability to the user. The data is stored according to at least one characteristic of the data, in which the at least one characteristic is related to the content of the data. It should be noted that at least one storage option according to the present invention is optionally deletion and/or destruction of the data, such that the data may optionally be removed from storage media or may optionally not be stored initially on the storage media. Optionally and more preferably, the data is stored for a time interval according to the at least one characteristic of the data. Most preferably, the data is moved to a different type of storage option after an event has occurred, for example after the time interval has elapsed. It should be noted that movement or migration of the data may also include deletion or removal of the data. Additionally, the compression of the data may be determined and/or may be altered according to further events, such as a change in the importance of the data, and/or changes to its content or to any external metadata related to the data itself. For example, if a telephone call, giving the details of an inquiry regarding a purchase was recorded, and later an important purchase was made based on this telephone call, the importance of the stored telephone call would become higher, and therefore this data should be stored in a location with easier access, and optionally less compression.

According to preferred embodiments of the present invention, the at least one characteristic of the data, according to which the storage option is selected, is examined by a rule engine. Preferably, the rule engine compares the at least one characteristic of the data to at least one rule, and then selects the storage option (or options) according to that rule. The rule engine therefore more preferably operates as a filter, for determining which storage option(s) is most appropriate for the examined data. The storage decision is then preferably implemented by a storage manager.

The rules according to which the rule engine operates are optionally manually entered by a human operator, or alternatively may optionally be generated automatically according to a predefined business rule or according to an automatically generated business rule, or a combination thereof.

Preferably, the present invention is operative with a system featuring a plurality of different storage options. More preferably, these different storage options include at least two different storage options having different types of accessibility and/or capacity. Examples of storage options having different types of accessibility and/or capacity include but are not limited to on-line storage, near-line storage and off-line storage. The type of storage media which is used for any particular storage option is not limited according to the present invention, as the present invention is operable with any suitable type of storage media, including but not limited to DAT (tape-based storage), AIT (also tape-based storage), LTO (an additional type of tape based storage), DLT (another type of tape based storage), magnetic storage media, optical disks, CD-ROM or a mass storage device of any type, or any type of storage system, or any combination thereof.

The at least one characteristic of the data, which is related to the content of the data, may optionally and preferably be obtained in a number of different ways. For example, the data may optionally and preferably have associated metadata, which is related to the content of the data. The metadata is more preferably added through annotation of the data itself. Such annotation is optionally performed manually, through human intervention, but is preferably performed automatically. More preferably, automatic annotation is performed after the data is automatically analyzed. The associated metadata is then preferably used to determine which storage option should be used for the data, and more preferably also the time interval during which the data should be placed in that storage option. Preferably, the metadata is CTI server metadata, which is optionally not formatted within the system of the present invention, and is used directly to determine the appropriate storage option for the data.

As previously described, the data is more preferably filtered by a rules engine, according to at least one characteristic of the data. For the implementation of the present invention with metadata, the filtering process is more preferably performed according to the associated metadata.

Automatic analysis of the data is more preferably performed according to the type of data being analyzed. Examples of different types of automatic analysis processes which may optionally be performed include but are not limited to, Computer Telephony Integration (CTI) for telephone or video communications being managed by a computer, speech-to-text conversion for voice communication data, a video analyzer for video data, OCR (optical character recognition) for printed matter which has been electronically scanned, image analysis for image data, text analysis for textual data, analyzers for user interface data, and analysis of metadata added at a later stage, due to information retrieved from CRM (Customer Relationship Management) servers or other third party servers.

These different types of data analysis processes are preferably performed according to the source of data, which may optionally be any suitable data source. Examples of different types of data sources include but are not limited to, video data, audio data (including also voice communication data such as voice over IP (VoIP) data, streaming audio data and any other type of audio-related data), coded data, e-mail messages and/or attachments, chat and other types of messaging system messages, documents transmitted by facsimile, user interface data, and PC or terminal screen recording.

In addition, the present invention is useful for the collection of data about substantially any type of user interface function. Examples of such user interface functions include but are not limited to any type of GUI window activity; activity with GUI gadgets such as buttons, sliders or any function provided through a GUI window; the display of any image and/or text, including but not limited to Web pages and/or any component thereof; information provided through an audible interface such as a synthesized voice; information provided through the display of video data; and any type of information which is provided through, or otherwise detectable by, the operating system of the user computational device.

According to preferred embodiments of the present invention, the data is preferably "migrated" or moved from a first storage option to a second different storage option, or the compression level of the document is changed on the same storage platform after a time interval has expired. The time interval is preferably determined according to the metadata.

The principles and operation of the method according to the present invention may be better understood with reference to the drawings and the accompanying description.

Referring now to the drawings, FIG. 1 shows a first exemplary system 10 for managing data according to the content of the data, with regard to the flow of operations through system 10.

As shown, system 10 features at least one input source of formatted data 12. Examples of different types of input data sources 12 for formatted data include but are not limited to, video data, audio data (including also voice communication data such as voice over IP (VoIP) data, streaming audio data and any other type of audio-related data), coded data, e-mail messages and/or attachments, chat and other types of messaging system messages, documents transmitted by facsimile and user interface data. With regard to user interface data, in which the action of a user upon operating a computational device and/or a peripheral device and/or input device thereof causes the data to be generated, optionally and preferably the data is in the form of an event. Each action of the user preferably causes an event to be generated. The event may then optionally form the data to be captured.

The captured data is optionally and preferably passed to a format analyzer 14 for rendering the captured data into a common format for analysis. Format analyzer 14 preferably features a plurality of format modules 16, each of which is suitable for data of a different type of format. For example, if the input data is voice communication data, then preferably a format module 16 converts the voice communication to textual data, for speech-to-text conversion. Different format modules 16 preferably handle other types of input data, as explained in greater detail with regard to FIG. 3 below.

According to a preferred embodiment of the present invention, the common data format is optionally and preferably textual data. For this preferred embodiment, textual data is optionally not further preprocessed by a format module 16, or alternatively is only minimally processed. Other types of data in different data formats are then preferably converted to textual data by format module 16, as described with regard to FIG. 3 below.

Next an analysis module 18 preferably analyzes the data, once the data is in the common format. It should be noted that optionally analysis module 18 is able to handle a plurality of different data formats, through a single module or alternatively from a set of such modules (not shown). Preferably, analysis module 18 operates on a plurality of different types and/or sources of data simultaneously, for example as a multi-thread application. For the non-limiting, illustrative example, as described above, textual data is analyzed, as is well known in the art. One non-limiting example of a text analyzer software program is the IntelligentMiner™ product available from IBM Corporation. This product is useful for analyzing text for a number of functions, such as locating information related to a topic, categorization of information and classification of information. Text analyzer tools are generally known in the art for extracting content and/or information related to the subject matter of text, for example according to one or more keywords, concepts or any other type of organization and/or analysis scheme.

According to another preferred embodiment of the present invention, the uniform format features a uniform data structure, with a plurality of different types and/or categories of information, for example data from screen events and voice data combined in a single file. This uniform data structure preferably is able to contain the different types or categories of characteristics which are of interest for being associated with the data, in order to determine the content of the captured data. Non-limiting examples of a uniform data structure which may optionally be implemented according to the present invention include structures which use XML (extensible mark-up language) or ASF (Advanced Streaming Format, from Microsoft Corp., USA).

Analysis module 18 preferably extracts and/or creates, or otherwise determines, at least one characteristic of the captured data, preferably obtained in the uniform format. Optionally and more preferably, analysis module 18 obtains the at least one characteristic from the captured data in the form of metadata. This metadata is then optionally stored in a metadata database (not shown, see FIG. 3).

According to an optional but preferred embodiment of the present invention, analysis module 18 also gives feedback for improving the performance of format analyzer 14 and/or format module 16, in order to improve the operation of these components. According to an additional optional embodiment of the present invention, there is a correlator (not shown), that correlates a plurality of sources of data, which may optionally and preferably include computer metadata, telephony metadata, formatted data and telephony content data, in order to obtain at least one characteristic of the data to be stored. The correlator then optionally and preferably transfers the data to analysis module 18. Metadata is retrieved by analysis module 18 optionally directly, or alternatively as an input source of data 12 (not shown).

The captured data, with the at least one characteristic related to the content of data, which is optionally and more preferably in the form of metadata, is then passed to a rule engine 20. Alternatively, rule engine 20 only receives the at least one characteristic, more preferably in the form of metadata. Rule engine 20 may optionally retrieve CTI server information 21 directly, if the CTI server metadata is not previously analyzed by analysis module 18. CTI server information 21 is a preferred form of metadata that may be retrieved, but optionally input sources of metadata additionally or alternatively include but are not limited to CRM input, third party content input or meta data server input, which can be for example text data (such as telephone numbers), audio data (such as the voice of a caller on the telephone) and video data. Additionally, rule engine 20 may read CTI server information 21 or any other retrieved metadata directly from the database in which it is stored.

The captured data is then passed directly to a storage manager 22. Rule engine 20 more preferably compares the metadata to at least one rule, which is most preferably a business rule specified by a manual human user, or alternatively may optionally be generated automatically according to a predefined business rule or according to an automatically generated business rule, or a combination thereof. Optionally, one or more rules may be fed to rule engine 20 through an interface 24, such as a GUI (graphical user interface) for example. As a non-limiting example, interface 24 may optionally be a simple Web browser-based interface. Rule engine 20 then preferably determines the type of storage option (or options) according to one or more rules, as selected through the comparison of the metadata (or characteristic) of the captured data to the rule(s). Additionally or alternatively, the output of rule engine 20 is optionally and preferably fed back to format analyzer 14, and/or format module 16, and/or analysis module 18.

Rule engine 20 optionally and more preferably determines both the type of storage option (or options), which should be selected for the particular captured data, and also the term of storage. Most preferably, the captured data is initially stored with a first storage option, and then is migrated (moved) to at least one additional storage option after a certain event takes place, such as a period of time that has elapsed or a change occurring in the metadata criteria. This event taking place is also most preferably determined according to at least one rule, by rule engine 20.

Rule engine 20 may optionally perform an action according to a rule and/or event, in which the event may optionally and preferably trigger automatic application of the rule. Examples for actions based on rules are given below. One example of actions which are based on rules include but are not limited to manipulations of stored data. For example, the compression of the data may optionally be altered after an event has occurred, such as a period of time has elapsed. A non limiting example of a reason for altering such compression is to enable more rapid playback of the data or to decrease the size of the stored data file upon change in data quality.

Previously stored data may optionally and preferably be updated with business data. Non limiting examples of such data include the addition of social security or identification number, customer identifier, preferred customer status information and so forth.

Current transaction data may also optionally and preferably be linked to the previously stored data file. Previously stored data may also optionally be updated. A non limiting example of such linking may optionally be performed by linking transactions performed by a certain high-status or preferred customer to past transaction by that customer.

Another event/action example may optionally be performed with multiple mirroring of data, for example by distributing identical data to several destinations and/or predefined locations and/or storage options. Such mirroring may optionally be performed for redundancy purposes, for example for security of the stored data, by duplicating to multiple storage locations/options, and/or for general availability reasons.

Storage manager 22 preferably then retrieves the output of rule engine 20 and the captured data. The output of rule engine 20 preferably includes at least one storage option for the captured data. As previously noted, this storage option could be a type of storage media or deletion and/or removal and/or destruction of the captured data. More preferably, the storage option includes a particular storage device 26 into which the captured data should be placed. Alternatively, storage manager 22 could determine the identity of the particular storage device 26 for storing the data.

According to another preferred embodiment of the present invention, system 10 integrates telephony resources, computerized resources, CRM resources and other third party metadata resources in order to provide added value services. These services include, but are not limited to, directing telephone calls to the right department at a business, authenticating callers by screening their telephone number and comparing it with a database, recognizing the voice of a caller, using the caller's voice in order to determine how to process a call, providing interactive voice response to callers, matching the telephone number of a caller with a previously known record such as a customer record, managing voice or video conferences, receiving fax messages and rerouting them to the appropriate location and targeting transactions with the best or otherwise selected customers for better (more rapidly accessed) storage.

Figure 2:
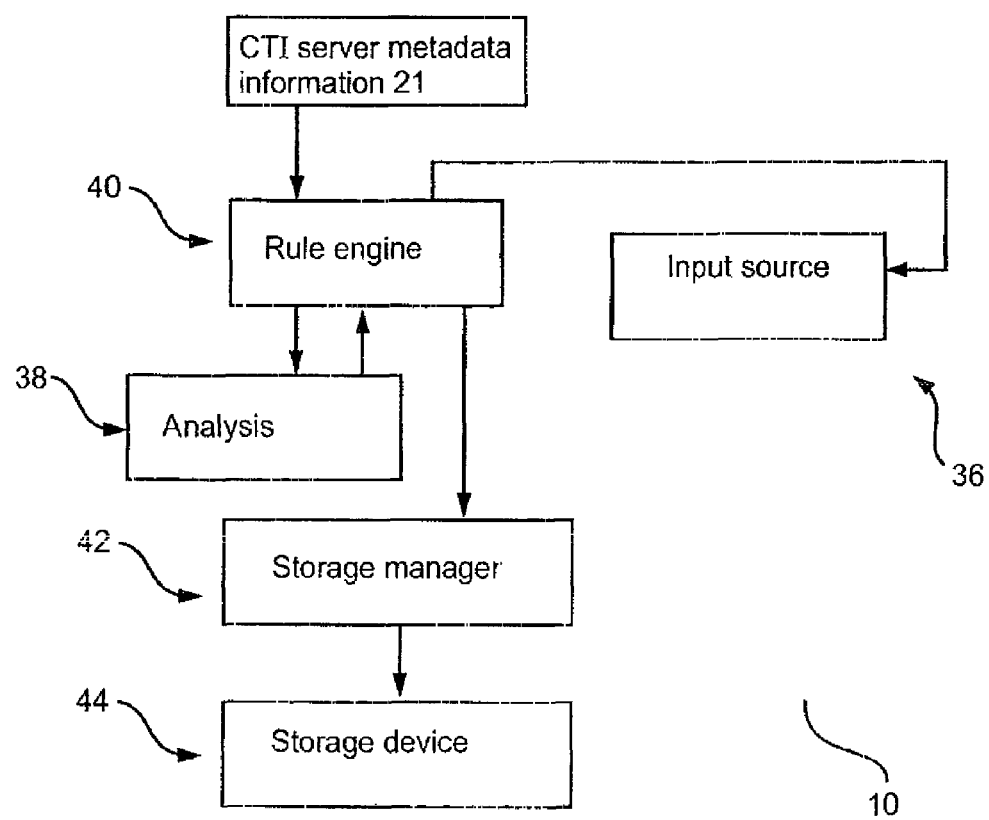
FIG. 2 is a schematic block diagram of another exemplary system and flow of operations according to the present invention.

FIG. 2 shows a different flow arrangement of the system of FIG. 1, as another example of a system according to the present invention. In this arrangement, system 10 again features a rule engine 40. However, in this implementation, rule engine 40 is the initiating process or component for subsequent actions which are performed by system 10. As shown, rule engine 40 takes the input source according to metadata obtained from an analysis module 38, or otherwise retrieves CTI server information 21 directly from the storage location of this information. Rule engine 40 then preferably sends the captured data, or alternatively only selected captured data, to a storage manager 42. Storage manager 42 sends the captured data to the correct storage option, shown as preferably being a selected storage device 44, according to a request for action by rule engine 40. Optionally and more preferably, and most preferably as necessary, rule engine 40 feeds back the captured data, and/or information about the captured data, into the input sources Improved metadata may optionally be obtained from analysis module 38.

According to an optional implementation of the present invention, the user defines a task in rule engine 40 for archiving certain types of information, such as information about specific telephone calls. Rule engine 40 then preferably uses analysis module 38 to select specific data. Analysis module 38 may optionally be implemented as a call management server, for example. The selected specific data may optionally be any one or more of voice data, data captured from user interface actions, video data, an e-mail transaction, facsimile data, VoIP, Web-co browsing data (obtained from two or more users viewing the same Web page(s) through different Web browser processes), or any coded data or any combination of any type of input sources. The data is obtained from input sources 36, which may optionally be implemented as an input sources logger. The captured data is then transferred into a storage manager 42.

This data can optionally be retrieved as required from storage devices 44, more preferably directly by using rule engine 40 and/or storage manager 42. Such retrieved data may then optionally and more preferably be fed into input sources 36 in order for the retrieved data to be widely accessible (available), and/or for further manipulation.

Figure 3:
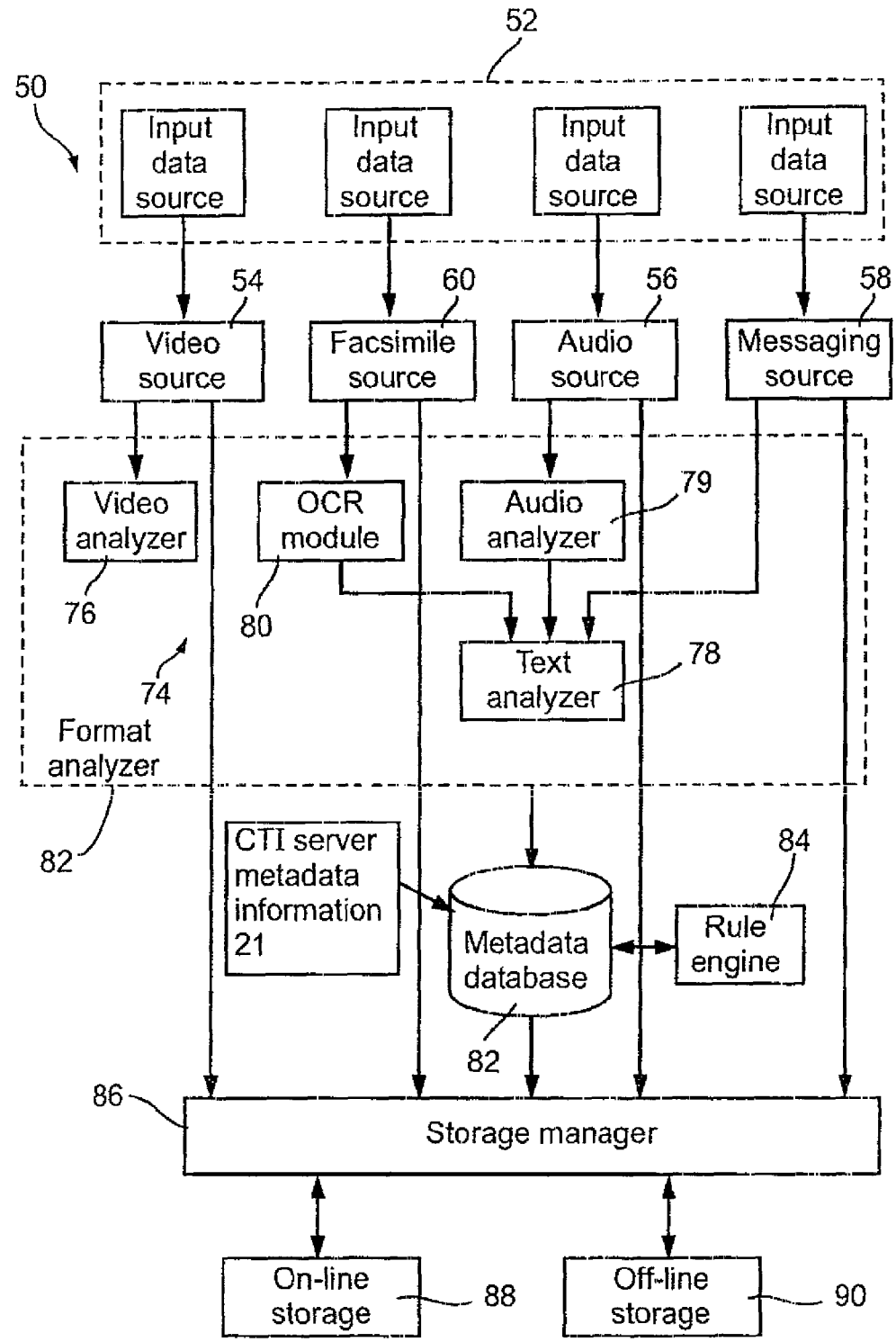
FIG. 3 is a schematic block diagram of a detailed exemplary system according to the present invention.

FIG. 3 shows an exemplary, detailed implementation of a system according to the present invention, which is related to the flow of operations shown in FIG. 1. As shown, a system 50 preferably features a plurality of input data sources 52. For the purposes of explanation only and without any intention of being limiting, input data sources 52 are shown as optionally and preferably including a video source 54 for video data, an audio source 56 for audio data, a messaging source 58 for e-mail messages (including attachments), instant messaging and/or chat data, and a facsimile source 60 for data which is transmitted by facsimile.

The input data from input data sources 52 is preferably then fed to at least one format analyzer 62 for rendering the captured data into a common format for analysis. Format analyzer 62 preferably features a plurality of format modules 74, each of which is suitable for data of a different type of format. For the purposes of illustration only and without any intention of being limiting, format modules 74 are shown as optionally and preferably including a video analyzer 76, a text analyzer 78, an audio analyzer 79 and an OCR (optical character recognition) module 80.

An example of text analyzer 78 was previously described with regard to FIG. 1. OCR module 80 may optionally be implemented as is well known in the art, for example through the use of OCR software having an algorithm which could easily be selected by one of ordinary skill in the art.

Video analysis may optionally be performed by video analyzer 76 as follows. Video data is obtained, for example from a camera as a non-limiting example of video source 54. A frame-grabber is then preferably used to obtain at least one frame from the video data. The frame is preferably analyzed. More preferably, only a portion of the frame is stored as captured data. For example, if a video camera is used to monitor the entrance to a secure area, then optionally only those frames, or alternatively those portions of each frame, which feature a human subject near the actual entrance are of interest. Additionally or alternatively, changes in the background of each frame may optionally be detected and tracked, as being of interest.

One example of a type of analysis which may be performed with the video data is a motion detection algorithm, which is well known in the art. Another example is face recognition algorithms, which are also well known in the art. Non-limiting examples of video analysis algorithms are described at http://www.cs.rochester.edu/u/nelson/research/motion/motion.html as of Dec. 31, 2001, for motion detection algorithms and at http://www-white.media.mit.edu/vismod/demos/facerec as of Dec. 31, 2001, for face recognition algorithms. More preferably, such analyses are performed with firmware, such as a DSP (digital signal processor) for example. The results may then optionally be stored as the captured data.

The output of format analyzer 62 preferably features at least one characteristic of the captured data which more preferably is metadata, as previously described. The metadata is more preferably stored in a metadata database 82. Additionally, CTI server metadata information 21 may optionally and preferably be stored in metadata database 82. A rule engine 84 then preferably analyzes the metadata from metadata database 82 (or alternatively obtained directly from format analyzer 62), in order to apply one or more rules to the captured data. Rule engine 84 may optionally be implemented with the BlazeSoftware Advisor product of Blaze Software (see http://www.blazesoft.com/product/advisor/index.html as of Dec. 31, 2001 for details). Rule engine 84 may also optionally be implemented as a rule/task engine from Nice Systems Ltd. (Ra'anana, Israel), for example based on business data. Regardless of the specific implementation, rule engine 84 preferably operates according to at least one business rule.

Rule engine 84 preferably compares the at least one characteristic of the data to at least one rule, and then selects the storage option (or options) according to that rule. Rule engine 84 therefore more preferably operates as a filter, for determining which storage option(s) is most appropriate for the examined data. The storage decision is then preferably implemented by a storage manager 86.

Preferably, storage manager 86 is able to select from a plurality of different storage options. More preferably, these different storage options include at least two different storage options having different types of accessibility and/or capacity. Examples of storage options having different types of accessibility and/or capacity include but are not limited to on-line storage, near-line storage and off-line storage. The type of storage media which is used for any particular storage option is not limited according to the present invention. For the purposes of illustration only and without any intention of being limiting, storage manager 86 is shown as being able to select from a plurality of storage devices, shown as an on-line storage device 88 and an off-line storage device 90. Of course, other types of storage devices and/or systems could be used in place of, or in addition to, these examples of storage devices.

Rule engine 84 is optionally and preferably able to feed back information to format analyzer 62, for improving the performance of format analyzer 62.

A non-limiting example of the operation of system 50 may be performed as follows. System 50 could optionally be implemented at a service center which processes services requests from customers remotely, such that the customer is not physically present at the service center. The customer therefore contacts service center personnel, for example through voice communication (such as a telephone call for example), e-mail messages, facsimiles and so forth. A plurality of business rules has been defined and implemented by rule engine 84, which could optionally include the following rules: a record is kept for every customer contact that refers to a financial transaction for at least three months even if no transaction occurred, and is kept for each contact in which a financial transaction occurred for at least seven years. In addition, the record for each contact resulting in an actual financial transaction is first stored in on-line storage for one month, and then in an off-line storage for the remainder of the term to seven years.

Once the customer has contacted a service center operator, for example through the telephone, data is provided through audio source 56 as an example of input source 52. This captured audio data is analyzed, for example in order to determine if the financial transaction occurred during the contact. If such a transaction occurred, then metadata associated with the captured audio data indicates such an occurrence. Format analyzer 62, and particularly audio analyzer 79, preferably analyzes the captured audio data to obtain such metadata.

The data itself from the call is preferably handled according to one or more business rules, which may optionally be defined manually and/or generated automatically, through the operation of rule engine 84. Optionally and preferably, the data is CTI server metadata information 21, and is handled directly by rule engine 84, without being formatted first. Preferably, rule engine 84 then generates an action to be performed by storage manager 86. For example, storage manager 86 may optionally store the data from the call, migrate the data to a new type of storage, or delete the data, or any other action or any combination of actions which should be performed according to one or more events. Thus, rule engine 84 is able to generate one or more instructions for execution by storage manager 86.

The system described in FIGS. 2-3 preferably also retrieves metadata upon which to base the analysis of the input data. Previously mentioned reference numbers designate a component having a same or at least similar function otherwise stated. Analysis system 400, described hereinbelow in more detail with regard to FIG. 4, optionally and preferably manages data such that formatting of the retrieved input data is not required, as system 400 uses only elements of the data not related directly to its content. In fact, the use of external metadata strengthens system 400 when handling information according to rules, or when making decisions regarding information that does not necessarily contain parts of the data, but is related to the value of the data. The strengthening of the system is due to the fact that for managing data values, the system does not need to handle the data itself in terms of capacity, location and format but rather manages the data according to the data characteristics. Data management according to data characteristics reduces the processing load, as there are smaller amounts of data processed, and reduced "data trafficking" in the system. In addition, the data characteristics supply an additional source of information about the data regarding how the data was obtained or to which part of the system is the data associated. Moreover, the information acquired by use of external metadata may be difficult or even impossible to obtain in a direct manner. The present invention enables a better pool of information to be acquired, and therefore enables better capabilities for analyzing the data or deciding upon a storage location for the data. The external information can also indicate the content of the data as may optionally be analyzed by an external tool.

Figure 4:
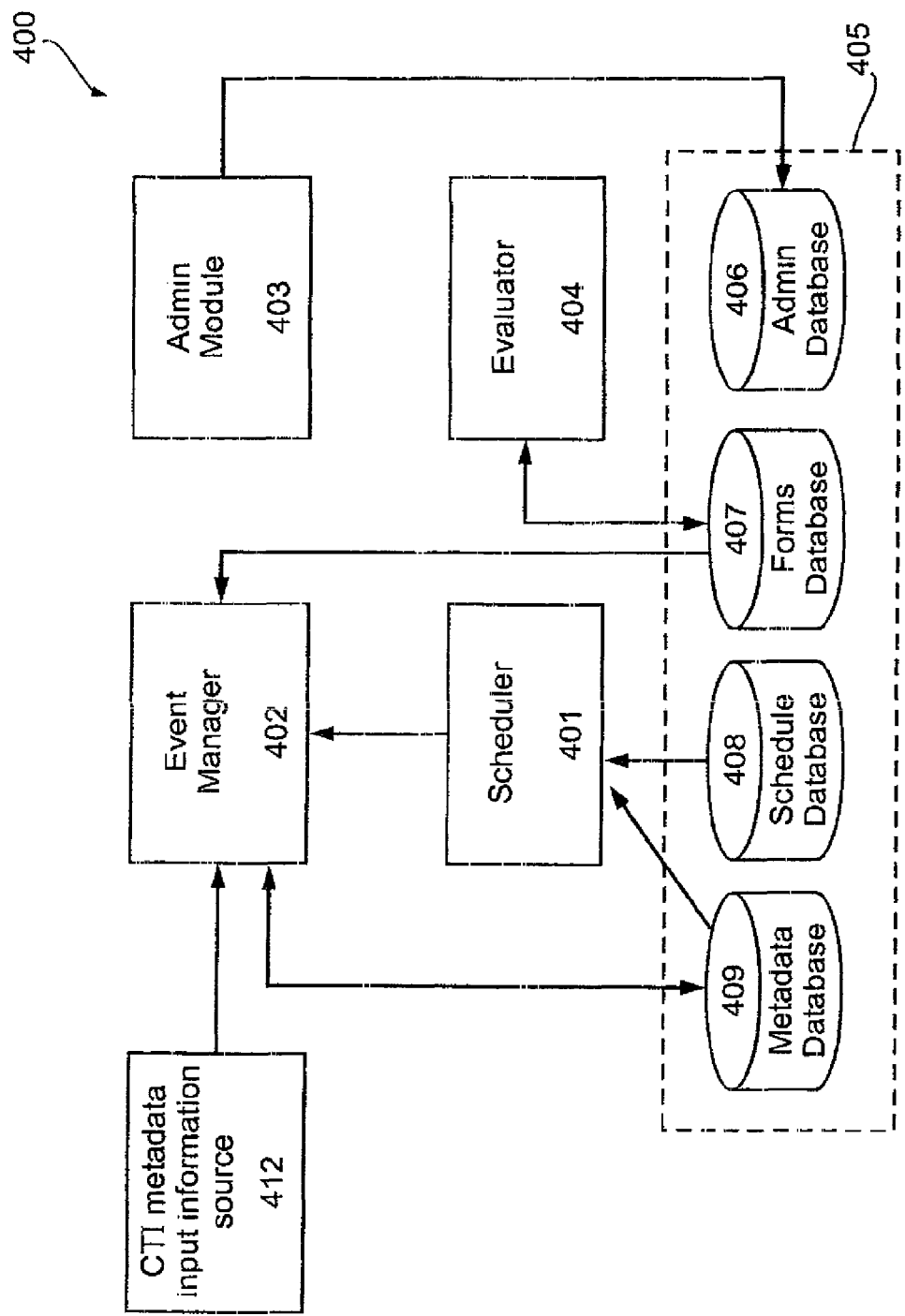
FIG. 4 is a simplified block diagram of a telephone call management system.

Additional reference is now made to FIG. 4 which is a detailed block diagram of a system 400. This diagram is brought as a non-limiting, illustrative example of the structure and use of system 400 taught in an exemplary fashion with regard to CTI based metadata. An exemplary such system is a call management system, such as CLS which is a proprietary name of Nice Ltd. as shown (as a non-limiting example) in FIG. 4. System 400 preferably comprises CTI metadata input information source 412, CTI server storage 405 featuring a metadata database 409 connected to an event manager 402, a schedule database 408 connected to scheduler 401, a forms database 407 connected to event manager 402, and an admin database 406 connected to admin module 403. In addition, scheduler 401 may optionally transfer information to event manager 402. The data stored by system 400 in CTI storage 405, for example metadata stored in metadata database 409, can alternatively be stored by storage manager 22 in storage device 26 (FIG. 1).

An event manager 402 retrieves CTI metadata input information from source 412, for example that of telephone calls that have been routed, and preferably logs this information in the connected metadata database 409, or alternatively stores such information by storage manager 22 in storage device 26. Such information typically includes external information about the received telephone call, such as the outside party's telephone number, the locations of the telephone call recordings in storage device 26, the time the call was made or received, and the duration of the call. Event manager 402 may provide audio data associated with a particular telephone call upon request, in response to which event manager 402 retrieves the requested audio data from metadata database 409 or from storage device 26.

A scheduler 401 provides event manager 402 with scheduling information stored in a connected schedule database 408 or otherwise stored in storage device 26 (FIG. 1) using storage manager 22. It may also provide scheduling information based on metadata retrieved from metadata database 409. The scheduling information may include non-temporal or event based CTI "scheduling" criteria. Non-limiting illustrative examples for such non-temporal criteria include telephone numbers that should or should not be monitored, specific data fields on display that when data are entered into the fields, signal that the call is to be monitored and external data gathered regarding the calling or called party. Optionally, the scheduling information may include temporal CTI scheduling data, such as in a non-limiting illustrative example recording all telephone calls in a certain period or block of time. Optionally a combination of temporal and non-temporal CTI scheduling data may be included in the scheduling information. A non limiting illustrative example of such a combination is recording at least X number of calls within a time period. In addition, the scheduling information may optionally include condition-based scheduling, which can be a condition based on a combination of time condition and an event condition as described above, and/or any other type of condition.

Scheduler 401 may optionally use the information in schedule database 408 or in storage device 26 to make scheduling determinations such as whether a telephone call received from or made to a particular telephone number, such as may be determined through Automatic Number Identification (ANI) or Dialed Number Identification Service (DNIS), is due to be recorded, or whether other calling functions, such as "call transfer" or "hold" as may be determined through DTMF activation signals, require monitoring.

An evaluator 404 preferably provides a means for designing evaluation forms and quality assurance examination, and for storing forms and evaluation data in a connected forms database 407. Evaluator 404 may retrieve audio data from a storage device, and perform automated evaluations in accordance with preprogrammed algorithms. Event manager 402 preferably accesses evaluation data stored in forms database 407 or in storage device 26 to support monitoring decisions as described hereinabove.

An administration module 403 provides for the definition of access permissions for various aspects of system 400 as well as security rules for such access. These definitions are stored in administration database 406, or they can optionally be stored by storage manager 22 in storage device 26.

Although not specifically shown in FIG. 4, any of event manager 402, scheduler 401, evaluator 404, and administration module 403 may access any of the information in metadata database 409, schedule database 408, forms database 407, and administration database 406, as well as data which was alternatively stored in storage device 26. For example, scheduler 401 may access administration database 406 to detect changes in permissions in the system, and modify scheduling information accordingly.

Figure 5:
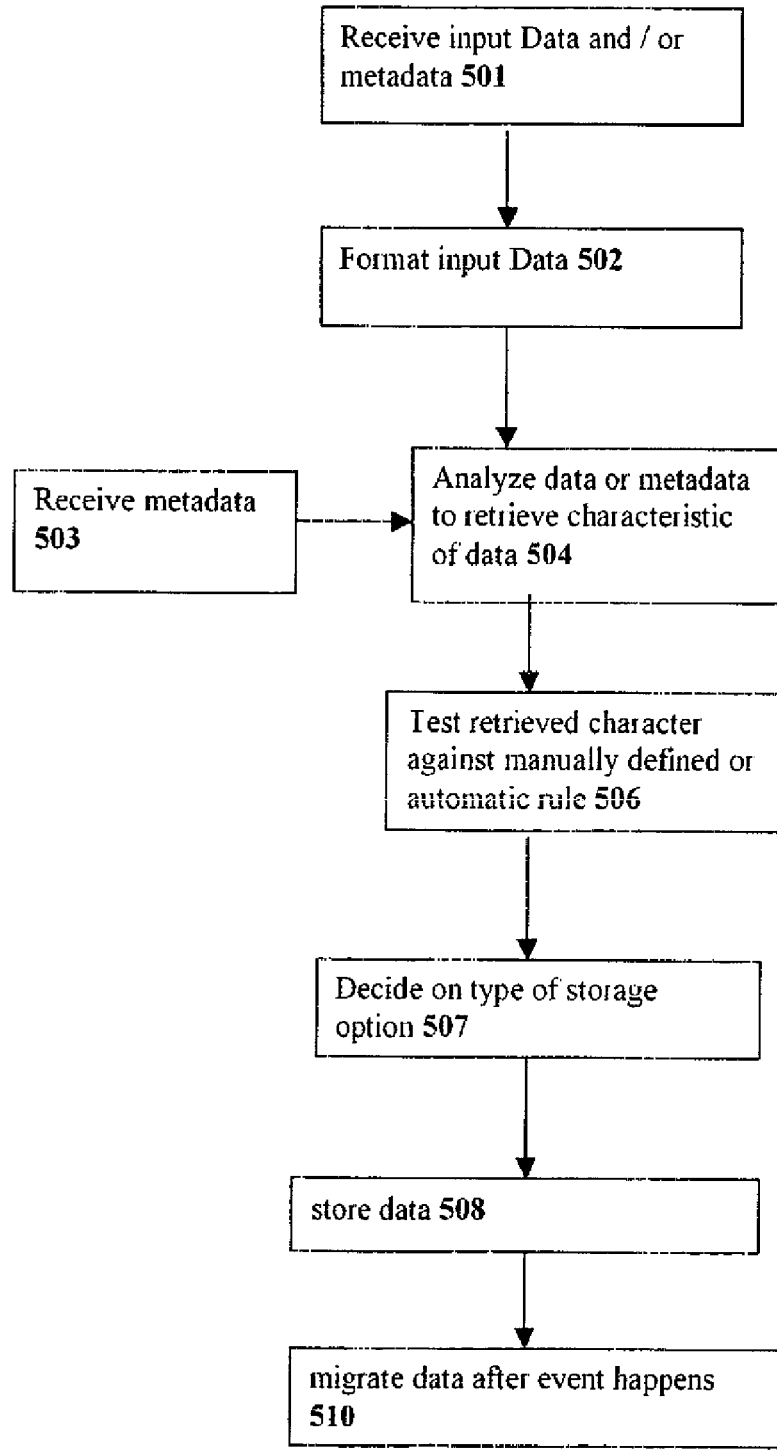
FIG. 5 is a simplified flow chart illustration of an exemplary use of the method of the present invention.

Reference is now made to FIG. 5, which is a simplified flow chart illustration of an exemplary method of the present invention, according to FIG. 1.

In the method of FIG. 5, input data 12 and/or metadata, preferably CTI server metadata information, is retrieved from any input data source, for example audio input data, video input data, email messages and facsimile input data (stage 501). The retrieved input data 12 and/or metadata is then formatted, to be in a standard format for analysis, for example being text data (stage 502). Analysis of the data and/or metadata or retrieval of metadata is then performed, in order to find at least one characteristic of the data, according to which a decision of the location of storage of the input data will be made (stage 504). Optionally, metadata could be retrieved after the formatting stage 502 in stage 503, in which case the retrieved metadata is preferably directly analyzed.

Once the data is analyzed and a characteristic of the data is obtained, it is tested against a business rule, either automatically generated or manually defined, in order to decide on the storage location for the retrieved input data and/or metadata (stage 506). The data will be stored in one location if it satisfies the rule, and in a different location, if the rule is not satisfied. Additionally, metadata may be stored in a metadata database, which can optionally be different from the databases controlled by storage manager 26. A decision may also be made about the compression level of the stored data, such that it may be stored in a more compressed format or in a less compressed format according to the checked satisfaction of the rule. Once the optimal storage option is decided upon (stage 507), the data and/or metadata is stored in the selected storage option (stage 508).

The location and compression level of the storage of the data may change, when specific events occur. For example, if a certain amount of time elapses from the time the data was originally stored, it may be migrated to a different storage location (stage 510).

Figure 6:
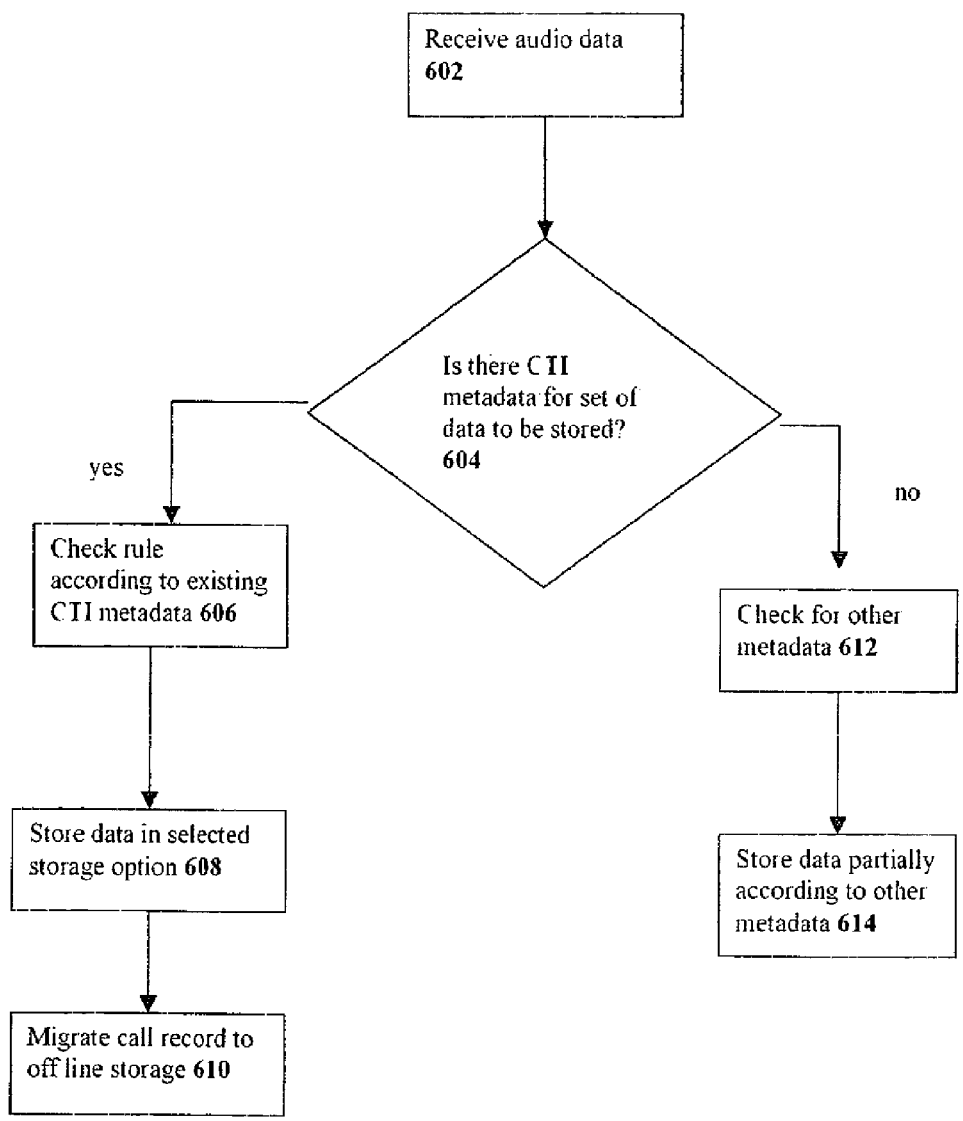
FIG. 6 is a simplified flow chart illustration of a method of operation on a telephone call monitoring system according to FIG. 3.

Reference is now made to FIG. 6, which is a simplified and exemplary flowchart illustration of a method of operation of metadata analysis system 10 of FIG. 1, and in particular of CTI metadata analysis, the method being operative in accordance with a preferred embodiment of the present invention.

In the method of FIG. 6, a notification of a telephone call is received as CTI audio input data 21, indicating a telephone conversation with a customer or other contact (stage 602). The CTI server retrieves real-time parameters regarding the telephone conversation directly from the telephone system, for example from a telephone trunk line such as RS232, by installing a specific driver which is suited to the specific CTI protocol. The server is directed at managing telephone calls using a computer, or having the computer act as a call center, and routing specific telephone calls to different locations, for example. When a telephone call is received, the driver creates a database entry that connects the CTI information with the logging device that recorded the call, and therefore at a later time a connection can be made between the CTI information and the recorded information. Any telephone conversation, facsimile communication, VoIP (voice over IP) or internet message, or any other type of telecommunication, can optionally be used as input for a CTI based analysis system. In the present example, the telephone conversation obtained is input for a CTI based analysis system according to the present invention, and is analyzed according to CTI based metadata, such as the time the call was made, and the number from which it was dialed, in order to determine the preferred storage option for this specific telephone conversation.

The retrieved audio data is then checked in stage 604 to see whether CTI metadata exists for the audio data, according to which the data may be analyzed. If such CTI metadata exists, the CTI metadata is compared to a business rule (stage 606), which may be an automatically extracted rule or a manually defined one. The comparison to the rule is the base for the decision of the preferred location and compression of the data and/or metadata storage, and for the duration the data will be stored. An example of such a rule would be checking whether the retrieved input data fits a business rule for near line/off line storage. The data is then stored in the storage option selected according to the above comparison (stage 608). Optionally and preferably, the data is migrated from the original storage location to a second storage location, after a certain event occurs, such as a certain amount of time elapsing from when the data was first retrieved (stage 610). If no CTI metadata exists for the retrieved data, a check is performed to find any other types of metadata (stage 612). The data is then preferably stored in a storage option, selected according to the metadata found (stage 614).

While the invention has been described with respect to a limited number of embodiments, it will be appreciated that many variations, modifications and other applications of the invention may be made.

What is claimed is:

1. A method for managing data storage comprising:
   receiving, over a service center communication network, a stream of audio data related to a communication;
   converting the audio data into textual data and automatically analyzing the textual data to determine at least one characteristic of the audio content of the received stream;
   generating, based on the analysis, textual analysis metadata associated with the audio content;
   receiving Computer Telephony Integration (CTI) metadata related to the stream of audio data communication;
   receiving, over the service center communication network, captured screen data; and
   automatically analyzing the screen data and generating screen data metadata based on the analysis screen; and
   selecting, according to said textual analysis metadata, CTI metadata and screen data metadata and according to at least one rule, either to store at least a portion of the audio data in a selected storage option from a plurality of storage options having different types of accessibility and capacity and placing at least said portion of the audio data in the selected storage option; or not to store the audio data and deleting said portion of the audio data.

2. The method of claim 1, wherein automatically analyzing the textual data comprises extracting content and information related to subject matter of the textual data according to one or more keywords.

3. The method of claim 1, wherein automatically analyzing the textual data comprises extracting content and information related to a topic, categorization of information and classification of information.

4. The method of claim 1, wherein said plurality of storage options include different types of devices having different access times.

5. The method of claim 1, wherein at least one storage option includes an on-line storage device and at least one storage option includes an off-line storage device.

6. The method of claim 1, wherein said at least one rule includes a time interval for holding the audio data in said selected storage option.

7. The method of claim 6, further comprising:
   migrating the audio data from a first selected storage option to a second selected storage option after said time interval has elapsed.

8. The method of claim 1, wherein said at least one rule is generated automatically according to business data.

9. The method of claim 1, wherein said at least one rule includes an action to be performed on the audio data according to an event, wherein said event is related to the at least one characteristic of the audio content of the received stream.

10. The method of claim 1, further comprising:
    receiving screen data pertaining to screen events of a computational device;
    rendering the screen data and the audio data into a common format; and
    combining the screen data and audio data into a single file.

11. The method of claim 1, wherein the method is performed within a service center and the audio data is associated with a telephone call between a customer and an operator of the service center.

12. A system for audio data management comprising:

a storage device;

a format module to receive, over a service center communication network, a stream of audio data related to a communication and to convert the audio data into textual data;

an analyzer to automatically analyze the textual data so as to determine at least one characteristic of the audio content of the stream and to generate, based on the analysis, textual analysis metadata associated with the audio content and further to automatically analyze captured screen data and to generate screen data metadata based on the analysis;

a computer telephony integration (CTI) server to receive Computer Telephony Integration (CTI) metadata related to the stream of audio data communication;

a rule engine to select according to the textual analysis metadata, CTI metadata and screen data metadata and according to at least one rule, either to store at least a portion of the audio data in a selected storage option from a plurality of storage options having different types of accessibility and capacity; or not to store the audio data; and a storage manager to receive a decision from said rule engine.

13. The system of claim 12, further comprising an input source to deliver the stream of audio data to said analyzer.

14. The system of claim 12, further comprising a plurality of storage devices having different types of accessibility and capacity, wherein said storage manager stores the audio data in one of said plurality of storage devices according to said decision.

15. The system of claim 12 comprising:

a correlator for correlating data originated from more than one source of data, the data selected from the group containing computer metadata, telephony metadata, formatted data and telephony content data for determining at least one characteristic of audio data to be stored.

16. The system of claim 12, further comprising a client relationship management (CRM) server to provide CRM metadata input associated with the communication, wherein said rule engine is further to compare at least a portion of the CRM metadata to at least one rule and to select one of a plurality of storage options based on said comparison.

* * * * *